United States Patent Office 3,605,193
Patented Sept. 20, 1971

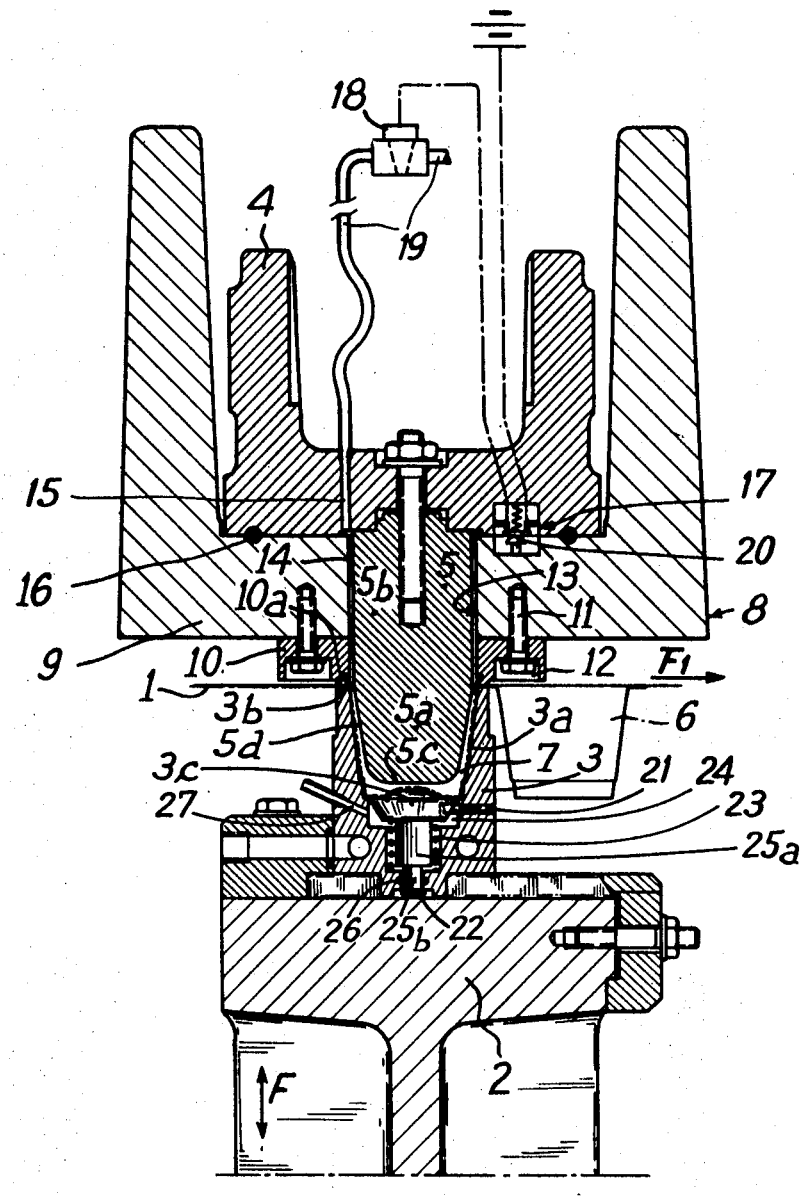

3,605,193
APPARATUS FOR FORMING HOLLOW ARTICLES
MADE OF THERMOPLASTICS MATERIAL
Etienne Marie Rogiers, Daknam, Belgium, assignor to
Intercan S.A., Fribourg, Switzerland
Filed Jan. 14, 1970, Ser. No. 2,794
Claims priority, application Belgium, Jan. 14, 1969,
68,721
Int. Cl. B29c 17/03, 17/00, 11/00
U.S. Cl. 18—19F
9 Claims

ABSTRACT OF THE DISCLOSURE

This disclosure relates to an apparatus for forming hollow articles made of thermoplastics material, wherein the locking plate 8 comprises a bore 13 coaxial to the mould 3, open at its two ends, the transverse section of which is equal to or slightly larger than that of the upper end of the hollow portion of the mould, the movable support 4 of the piston 5 is mounted so as to be able to move independently of the locking plate and rests, at the end of the piston stroke, on said locking plate, and a sealing joint is interposed between the locking plate and the movable support and surround the upper end of the bore. The disclosure is also applicable to installations for the large-scale manufacture of containers made from thermoplastics material.

The present invention has for its object an apparatus for forming hollow articles made of plastics material, such as yoghurt cartons or packings of the same type, as well as glasses made of plastics material.

The present invention relates more particularly to an apparatus for forming hollow articles made of thermoplastics material from a pre-heated thermoplastics sheet, of the type comprising a movable frame supporting a hollow mould, open in its upper part, having the same internal shape as the article to be manufactured, a movable support for a preforming piston, whose active part has dimensions which are slightly smaller than those of the hollow portion of the mould, and a movable locking plate cooperating with the upper edge of the mould, the pre-forming piston being guided with respect to the locking plate and being capable of engaging in the hollow mould after the relative displacement of the movable frame and the locking plate towards one another, this displacement being effected perpendicularly to the plane of advance movement of the thermoplastics sheet.

Numerous apparatus for forming hollow articles are known, of the type such as that comprising a movable frame, a hollow mould unitary with said frame and a movable support on which is mounted a pre-forming piston or punch capable of engaging in the hollow mould, the relative displacement of the support and the frame being effected in a direction perpendicular to the plane of advance movement of the sheet of thermoplastics material from which the hollow articles are manufactured. The movable support in the form of a bell generally constitutes the locking plate intended to hold the plastics sheet firmly against the upper edge of the upwardly open mould, during the forming operation. The pressurised fluid, admitted into the blank produced by the pre-forming piston, and intended to apply said blank against the inner walls of the mould in order to give it the exact shape of the mould, is usually injected through the channels and apertures made in the pre-forming piston or in the bell-shaped locking plate inside which said piston is placed.

Although this apparatus is applicable in many cases it is none the less true that it does not enable hollow article to be manufactured at an increased rate, having relatively thin walls with respect to the base of the article, which must be sufficiently thick in order to be manipulated without risk of deterioration.

Another drawback resides in the fact that it is necessary to inject a large quantity of pressurised fluid into the bell-shaped support when the pre-forming of the article is terminated, in order to apply the blank of the article against the internal walls of the mould and give it its final form. In addition, the bell through which the control rod of the piston passes must be provided with a sealing joint, the condition of which becomes rapidly defective due to the permanent friction of the rod, so that the forming apparatus must often be stopped in order to replace the sealing joint.

The present invention obviates the above-mentioned drawbacks and has for its object an apparatus permitting the manufacture of hollow articles having thin side walls with respect to the base, using only a relatively small quantity of pressurised fluid and at an increased rate.

To this end, the apparatus of the type mentioned above is characterised according to the invention, in that the locking plate comprises a bore coaxial to the mould, open at its two ends, and the transverse section of which is equal to or slightly larger than that of the upper end of the hollow part of the mould, the active part of the pre-forming piston is unitary at its upper end with a piston part having the same section as that of the upper end of the active part, this part of the piston being housed in the bore and defining with this latter an annular space of small volume connectable to a source of pressurised fluid, the movable support of the piston is mounted so as to be able to move independently of the locking plate, and rests at the end of the operating stroke of the piston on said locking plate, and the outer seal of the annular space, at the end of the piston stroke, is ensured by means of an annular joint interposed between the locking plate and the movable support or the pre-forming piston and surrounding the upper end of the bore.

One advantage of the present invention resides in the fact that the consumption of compressed air is very low and that the pressure applying the blank against the inner wall of the mould is rapidly attained, without a harmful excess pressure being produced whilst the piston is in its the downward stroke.

The invention will be described in greater detail with reference to the accompanying drawing, in which:

The single figure shows a vertical axial section through the forming apparatus according to the invention.

The hollow articles are formed from a thermoplastics sheet which, before arriving at the forming apparatus, is treated at a heating station.

As may be seen from the single figure, the forming apparatus is generally constituted by a frame 2, which is movable axially and perpendicularly with respect to the plane of displacement of the thermoplastic sheet 1 in the direction of double arrow F, by an upwardly open hollow mould 3 unitary with the movable frame 2, by a movable support 4 on which is mounted a pre-forming piston or punch 5 capable of engaging, preferably from above, in the hollow mould 3 during the relative displacements of the movable frame 2 and of the support 4, said displacements being effected in a direction perpendicular to the plane of advance movement of the thermoplastics sheet 1 whose direction of displacement is indicated by arrow F1, the mould 3 being arranged on one side, and preferably underneath, and the performing piston 5 as well as its support 4 being disposed on the other side of said thermoplastics sheet 1.

The pre-forming piston 5 is guided axially with respect to a locking plate 8 and is so shaped that its active part 5a acting on the thermoplastics sheet 1 has a shape similar, and dimensions very close to, but smaller than those of the female part of the mould 3. For example, the ratio between the dimensions taken from a transverse section of the mould 3 on the one hand of the cavity of the mould 3 and on the other hand of the pre-forming piston 5 has values of between 1/0.95 and 1/0.65, this latter value being applicable only to the base of the mould 3 and the free end of the piston 5. Thus, the blank made on the thermoplastics sheet 1 is close to the final shape of the hollow article 6 to be manufactured, when the pre-forming piston 5 is completely engaged in the hollow mould 3, i.e. at the end of the operating stroke. The active part 5a of the piston 5, and the female part of the mould 3 may have the form of a cylinder, a frustum of a cone, a polyhedron or a frustum of a pyramid. The piston 5 has an upper part 5b unitary with the upper end of the active part 5a of the piston and of cylindrical or polyhedral form according to whether the transverse section of the active part 5a is circular or polygonal. When the piston 5 is in completely engaged position, the small base 5c of the active part 5a is near the base of the hollow mould 3, and its outer lateral will 5d defines with the inner wall 3a of the hollow mould 3 a small space 7. Of course, the space existing between the inner wall 3a of the mould 3 and the surface of the active part 5a of the piston 5 has a thickness at least equal to double the thickness of the thermoplastics sheet 1 in the non-drawn state.

The movable support 4 is arranged above a locking plate 8 constituted by an upper portion 9 in the form of a stirrup, and by a lower portion 10 precision machined on its lower face 10a intended either to apply, in tight manner, the thermoplastic sheet 1 against the upper face 3b of the mould 3, or to serve as a stop for said thermoplastics sheet 1 when this latter is raised by the upper edge 3b of the mould 3, or to serve as a stop for said thermoplastics sheet 1 when this latter is raised by the upper edge 3b of the mould 3, the portions 9 and 10 are rendered integral by any suitable means, such as screw 11, the head of which is arranged in a housing 12 provided in the portion 10, so that, during forming, the head of the screw 11 cannot come into contact with the thermoplastics sheet 1. The shape of the front edge 10a of the portion 10 is identical to that of the edge 3b of the hollow mould 3.

In the portions 9 and 10, i.e. in the locking plate 8, there is made a bore 13 open at its two ends and in which the pre-forming piston 5 moves. This bore is coaxial to the hollow or female part of the mould 3 and has the same transverse section or a section slightly larger than that of the upper end of the hollow part of the mould 3. The upper part 5b of the piston 5 is housed in the bore 13 and defines with this latter a small space in the form of a polygonal or cylindrical ring 14 capable of being connected to a source of pressurised fluid (not shown) through a channel 15 made either in the movable support 4, in the locking plate 8, or in the piston 5. The locking plate 8 is preferably movable in the direction of arrow F over a relatively short distance. It is important that the movable support 4 be able to move in the same direction as the locking plate 8, but independently thereof and abut against the upper central face of the locking plate 8 only at the end of the operating stroke of piston 5. It is therefore ensured that the annular space 14 remains in the free air during the operating stroke of the piston 5, this avoiding the production of any excess pressure on the thermoplastics sheet 1.

The outer seal of the annular 14 is ensured by a sealing joint 16 placed for example on the upper face of the locking plate 8 as shown in the drawing, and by the lower face of the movable support 4, which face, at the end of the operating stroke of the piston 5, abuts against the joint 16, the opening of the channel 15 being, of course, located between the level of the joint 16 and that of the lower face 10a of the locking plate 8.

As has already been mentioned, the channel may be provided in the movable support 4, preferably in alignment with the space 14, or in the locking plate 8, or in the upper part 5b of the piston 5. It speaks for itself that the movable support 4 and the locking plate 8, where this latter is also movable, are guided in their movements by means (which have not been shown in the drawing).

According to a particular embodiment of the invention, the height of the upper part 5b of the piston 5 is equal to that of the bore 13 of the locking plate 8, and in any case, equal to the height between the lower face 10a of the locking plate and the location of the sealing joint 16 on the locking plate 8. A limit switch 17, capable on the one hand of acting on an inlet valve, such as an electro-valve 18, provided in a conduit 19 connecting the channel 15 to a source of pressurised fluid (not shown), such as compressed air, in the annular space 14 when, at the end of the operating stroke, the pre-forming piston 5 has reached its lower position, completely engaged in the mould 3, is provided on the support 4 and is actuated by a member 20 unitary with the locking plate 8. This limit switch is preferably interposed between the movable support 4 and the locking plate 8 and is located near the sealing joint 16.

According to a particular advantageous embodiment, where a plurality of pistons 5 are mounted on the same movable support 4, the sealing joint 16 is fixed to the upper face of the locking plate 8 near the different bores 13 of the locking plate 8, so as to surround all the bores 13 and all the pistons 5. This measure enables the pistons to be brought even closer together and leaves no useless space between these pistons 5.

The base 3c of the mould 3 is mounted to be axially movable with respect to the body of the mould 3, an upper stop 21 limiting its descending stroke and a lower stop 22 limiting its ascending stroke. The strokes of the movable base 3c are very small. A return spring 23 housed in a chamber 24 of the body of the mould 3 constantly urges the movable base 3c in upward direction, so that the lower stop 22 is permanently applied against a stop face of the hollow mould 3. The movable base 3c is extended downwardly by means of two rod sections 25a, 25b, the section 25b of which passes through the chamber 24 and, in sealed manner, through the wall of the mould body and carries the lower stop 22, a sealing joint 26 being provided in the wall of the mould body at the level of the rod section 25b. There is a slight clearance between the wall of the chamber 24 and the movable base 3c. The chamber 24 communicates in addition through a boring 27 with a vacuum pump (not shown). This arrangement enables the thermoplastics sheet 1 to come into contact correctly with at least the lower part of the inner wall and the movable base 3c of the mould 3.

The operation of the device according to the invention is a follows:

When the thermoplastics sheet 1 reaches the forming station according to the invention, the movable frame 2 is in a low position with respect to its operating position during forming. As soon as the forming operation has started the frame 2 is raised until the edge 3b of the hollow mould 3 is in contact with the immobilised thermoplastics sheet 1. The locking plate 8 is lowered, for example by means of a jack (not shown) connected to the upwardly curved arms of the portion 9, from the high position that it occupied during the rest period, until it comes into contact with the upper face of the thermoplastics sheet 1, whilst applying this latter against the upper face of the mould 3. The pressures exerted by the locking plate 8 and hollow mould 3 on the two faces of the thermoplastics sheet 1 prevent any displacement of this latter during the later forming of a container 6. By means of a jack (not shown) which acts on the movable support 4 on the upwardly curved arms, the piston 5 is lowered into the hollow mould 3 in order to form in the thermoplastics sheet 1 a blank of the hollow article to be produced. When the piston 5 has reached its lower end position, i.e., when the movable support 4 is resting on the sealing joint 16 of the locking plate 8, the limit switch 17 closes, so that the electro-valve 18 opens, pressurised fluid is sent into the annular space 7 and the blank of the hollow article is applied by this fluid against the inner walls of the hollow mould 3 in order to give the hollow article its final shape. During this operation, the chamber 24 may be connected to the vacuum pump in a similar way to that mentioned above for the annular space 7.

The mould 3 is then lowered from a height at least equal to that of the container 6, and the support 4 with its piston 5, as well as the locking plate 8 are raised, the piston 5 being placed in a piston where its active part 5a is completely located inside the bore 13, whilst the locking plate 8 is raised only by a small amount. Consequently, the hollow article formed or the container 6 is completely released from the mould 3 and the thermoplastics sheet 1 may be displaced by one step, so that a new piece of said sheet 1 is located above the mould 3. A new operation for forming a container may then commence.

I claim:
1. An apparatus for forming hollow articles made of plastics material from a pre-heated thermoplastics sheet, of the type comprising a movable frame supporting a hollow mould open in its upper part and having the same internal shape as the article to be manufactured, a movable support for a pre-forming piston whose active part has dimensions slightly smaller than those of the hollow part of the mould, and a movable locking plate cooperating with the upper edge of the mould, the pre-forming piston being guided with respect to the locking plate and capable of being engaged in the hollow mould after the relative displacement of the movable frame and the locking plate towards one another, this displacement being effected perpendicularly to the plane of advance movement of the sheet of plastics material, wherein the locking plate comprised a bore coaxial to the mould, open at its two ends, and the transverse section of which is equal to or slightly greater than that of the upper end of the hollow portion of the mould, the active part of the pre-forming piston is unitary at its upper end with a piston part having the same section as that of the upper end of the active part, said piston part being housed in the bore and defining with the latter a very small space capable of being connected to a source of pressurised fluid, the movable support of the piston is mounted so as to be movable independently of the locking plate and rests, at the end of the piston stroke, on said locking plate, and the outer seal of said space, at the end of the piston stroke in the mould, is ensured by means of a joint interposed between the locking plate and the movable support and surrounding the upper end of the bore.

2. A forming apparatus as claimed in claim 1, wherein the height of the upper part of the pre-forming piston is at least equal to that between the lower face of the locking plate and the location of the annular joint on the locking plate.

3. A forming apparatus as claimed in claim 1, wherein the height of the upper part of the pre-forming piston is equal to the height of the bore provided in the locking plate.

4. A forming apparatus as claimed in claim 1, wherein the opening of a channel connecting the source of pressurized fluid with the space between the bore of the locking plate and the pre-forming piston is located between the sealing joint and the lower face of the locking plate.

5. A forming apparatus as claimed in claim 1, wherein a limit switch capable of acting on an electro-valve which controls the inlet of the pressurized fluid into the space between the bore and the upper part of the pre-forming piston, is provided on the movable support of said piston and capable of being actuated by a member unitary with the locking plate.

6. A forming apparatus as claimed in claim 1, comprising a plurality of pistons mounted on the same movable support and a plurality of corresponding bores in a single locking plate, wherein a single sealing joint is fixed to the upper face of the locking plate near the different bores, so as to surround all said bores and all the pistons.

7. A forming apparatus as claimed in claim 5, wherein the limit switch and its actuator member are arranged respectively on the movable support and the locking plate inside the zone surrounded by the sealing joint.

8. A forming apparatus as claimed in claim 1, wherein there is provided below part of the mould and capable of being connected to a vacuum pump.

9. A forming apparatus as claimed in claim 8, wherein the base of the mould is movable with respect to the body thereof.

References Cited

UNITED STATES PATENTS

| 3,321,562 | 5/1967 | Wanderer | 18—19FX |
| 3,342,914 | 9/1967 | Edwards | 18—19FX |
| 3,445,892 | 5/1969 | Amberg et al. | 18—19F |
| 3,453,162 | 7/1969 | Turner | 18—9FX |

J. SPENCER OVERHOLSER, Primary Examiner

R. L. SPICER, Jr., Assistant Examiner

U.S. Cl. X.R.

18—19R